United States Patent
Kurumida

[19]

[11] Patent Number: 6,126,342
[45] Date of Patent: *Oct. 3, 2000

[54] OUTPUT DEVICE CAPABLE OF HIGH QUALITY OUTPUT OF CHARACTERS OVER A LARGE RANGE OF SIZES

[75] Inventor: Tsuneaki Kurumida, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/412,207

[22] Filed: Mar. 27, 1995

Related U.S. Application Data

[63] Continuation of application No. 08/232,352, Apr. 22, 1994, abandoned, which is a continuation of application No. 08/058,787, May 10, 1993, abandoned, which is a continuation of application No. 07/866,272, Apr. 13, 1992, abandoned, which is a continuation of application No. 07/400,862, Aug. 30, 1989, abandoned.

[30] Foreign Application Priority Data

Aug. 31, 1988 [JP] Japan .................................. 63-216954

[51] Int. Cl.⁷ ...................................................... B41J 11/44
[52] U.S. Cl. .............................. 400/76; 345/144; 345/470
[58] Field of Search ........................ 400/61, 76; 395/150, 395/151, 110; 345/469, 470, 144, 25; 358/261.4

[56] References Cited

U.S. PATENT DOCUMENTS

| | | | |
|---|---|---|---|
| 4,254,468 | 3/1981 | Craig | 345/469 |
| 4,316,188 | 2/1982 | Cancasci | 340/735 |
| 4,331,955 | 5/1982 | Hansen | 340/731 |
| 4,338,673 | 7/1982 | Brown | 345/469 |
| 4,345,245 | 8/1982 | Vella et al. | 345/25 |
| 4,511,267 | 4/1985 | Pokorny | 400/121 |
| 4,630,309 | 12/1986 | Karow | 382/21 |
| 4,770,552 | 9/1988 | Nishijima | 400/121 |
| 4,794,451 | 12/1988 | Suzuki | 340/730 |
| 4,833,721 | 5/1989 | Okutomi | 382/21 |
| 4,847,607 | 7/1989 | Schoon | 345/144 |
| 4,857,904 | 8/1989 | Schoon | 345/144 |
| 4,870,498 | 9/1989 | Schoon | 358/261.4 |
| 4,896,147 | 1/1990 | Futakata | 340/731 |
| 4,907,282 | 3/1990 | Daly | 382/47 |
| 4,918,624 | 4/1990 | Moore | 364/518 |
| 5,398,311 | 3/1995 | Seto | 395/151 |

FOREIGN PATENT DOCUMENTS

| | | | |
|---|---|---|---|
| 267732 | 5/1988 | European Pat. Off. | 340/735 |
| 60759 | 3/1988 | Japan | 400/61 |
| 2131660 | 6/1984 | United Kingdom | 340/727 |

OTHER PUBLICATIONS

IBM Technical Disclosure Bulletin vol. 31 No. 2 Jul. 1988 pp. 389–391.

Patent Abstracts of Japan, vol. 12, No. 396 (for Kokai 63–076080), Shibata, Published Apr. 6, 1988.

Patent Abstracts of Japan, vol. 12, No. 235 (for Kokai 63–026782), Kameoka, Published Feb. 4, 1988.

*Primary Examiner*—Eugene Eickholt
*Attorney, Agent, or Firm*—Fitzpatrick, Cella, Harper & Scinto

[57] ABSTRACT

An output device has storage means for storing a compressed font, representing characters by compressed data corresponding to dot patterns, a first generation unit for generating dot patterns based on the compressed data, and a second generation unit for generating outline information of characters from the compressed data and then generating dot patterns. The first generation unit or the second generation unit is selected in accordance with an output condition.

21 Claims, 13 Drawing Sheets

FIG. 4

| y | BLACK | WHITE | BLACK | WHITE | BLACK |
|---|---|---|---|---|---|
| 0 | 8 | 10 | EOL | | |
| 1 | 8 | 10 | EOL | | |
| 2 | 7 | 11 | EOL | | |
| 3 | 7 | 11 | EOL | | |
| 4 | 7 | 11 | EOL | | |
| 5 | 6 | 12 | EOL | | |
| 6 | 6 | 12 | EOL | | |
| 7 | 5 | 13 | EOL | | |
| 8 | 5 | 8 | 9 | 13 | EOL |
| 9 | 4 | 8 | 9 | 14 | EOL |
| 10 | 4 | 8 | 9 | 14 | EOL |
| 11 | 4 | 7 | 10 | 14 | EOL |
| 12 | 3 | 7 | 10 | 15 | EOL |
| 13 | 3 | 6 | 11 | 15 | EOL |
| 14 | 3 | 6 | 11 | 15 | EOL |
| 15 | 2 | 6 | 11 | 16 | EOL |
| 16 | 2 | 16 | EOL | | |
| 17 | 1 | 17 | EOL | | |
| 18 | 1 | 5 | EOL | | |
| 19 | 0 | 4 | EOL | | |
| 20 | 0 | 4 | EOL | | |
| 21 | 0 | 3 | EOD | | |

EOL : END OF LINE
EOD : END OF DATA o : CONTROL POINTS
o—o : STRAIGHT LINES

0°
(ORIGINAL)    90°    180°    270°

OUTPUT DEVICE CAPABLE OF HIGH QUALITY OUTPUT OF CHARACTERS OVER A LARGE RANGE OF SIZES

This application is a continuation of application Ser. No. 08/232,352 filed Apr. 22, 1994, which is a continuation of application Ser. No. 08/058,787 filed May 10, 1993, which is a continuation of application Ser. No. 07/866,272 filed Apr. 13, 1992, which is a continuation of application Ser. No. 07/400,862 filed Aug. 30, 1989, all now abandoned.

BACKGROUND OF THE INVENTION

1. Field of the Invention

The present invention relates to an output device for outputting characters using a run length font.

2. Related Background Art

A conventional printer for printing characters of variable size has a single character generation system and character data adapted to the character pattern generation system.

In the prior art printer which processes characters ranging from a large size to a small size using a single character pattern generation system, the following disadvantages are observed.

(1) In the character pattern generation method which uses a system suitable for the generation of large size characters, the quality of characters is degraded when characters of small size generated.

(2) In a character pattern generation method which uses a system suitable for the generation of small size characters, the quality of the characters is degraded when characters of large size is generated.

In order to generate characters of all sizes in a single system without degradation of quality, much correction information is required.

Those problems equally apply, in many cases, to different types of character editing.

SUMMARY OF THE INVENTION

It is an object of the present invention to provide an output device which may select one of a plurality of methods for generating characters from run length data in accordance with an output condition.

According to one aspect of the present invention is provided an output device which comprises storage means for storing compressed font representing characters by compressed data corresponding to dot patterns, first generation means for generating dot patterns based on the compressed data, second generation means for deriving character outline information from the compressed data and generating dot patterns, and selection means for selecting the first or second generation means in accordance with an output condition.

According to another aspect of the present invention is provided an output means which comprises storage means for storing patterns represented by compressed data corresponding to dot patterns, first generation means for generating dot patterns based on the compressed data stored in the storage means, derive means for deriving outline information of the patterns from the compressed data, second generation means for generating dot patterns based on the outline information derived by the derive means, and output means for outputting the dot patterns generated by the first or second generation means.

According to still another aspect of the present invention is provided an output device which comprises derive means for deriving outline point data of patterns based on compressed data corresponding to dot patterns, detection means for detecting a linear portion from the outline point data derived by the derive means, and storage means for storing outline information including start point data and end point data representing the linear portion, in accordance with the detection by the detection means.

According to still another aspect of the present invention is provided an output device which comprises storage means for storing compressed data corresponding to dot patterns, derive means for deriving outline information from the compressed data, recognition means for recognizing edit information for patterns, and selection means for selecting a rotation process for the compressed data stored in the storage means or a rotation process for the outline information derived by the derive means, in accordance with the edit information recognized by the recognition means.

BRIEF DESCRIPTION OF THE DRAWINGS

FIG. 4 shows an example of run length data.

DESCRIPTION OF THE PREFERRED EMBODIMENTS

Figure 1:
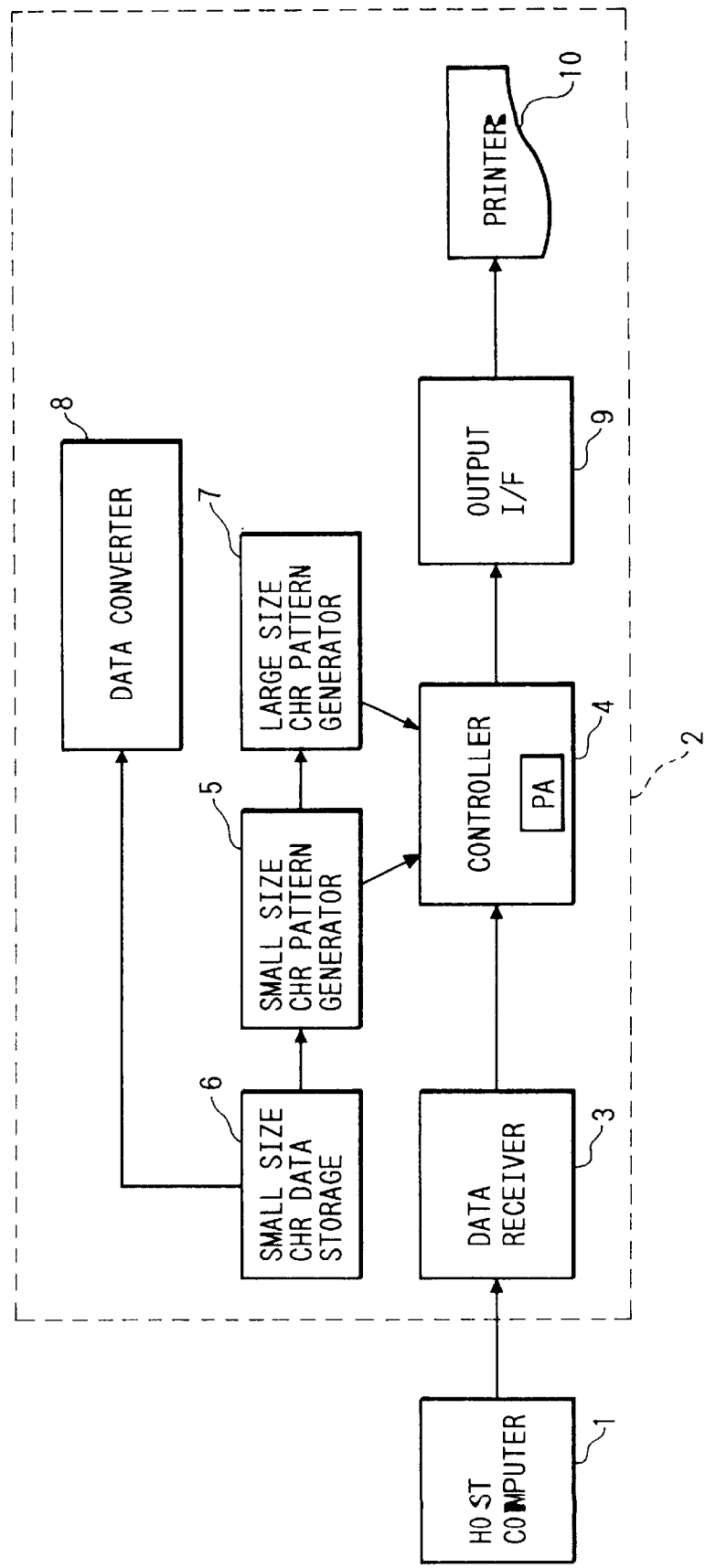
FIG. 1 is a block diagram of an embodiment of a printer in accordance with the present invention.

FIG. 1 best shows a feature of the present invention. Numeral 1 denotes a host computer which sends data, numeral 2 denotes a printer which embodies the present invention, numeral 3 denotes a data receiver for receiving the data sent from the host computer 1, numeral 4 denotes a controller which decodes and executes the data received by the data receiver 3 and which has a program area PA for storing a control program represented by a flow chart shown in FIG. 2, numeral 5 denotes a small size character pattern generator which generates character patterns when characters smaller than a reference size are to be printed, and numeral 6 denotes a small size character data storage which stores data to be used when the character patterns are generated by the pattern generator 5. The small size character data may be run length font data. Numeral 7 denotes a large size character pattern generator which generates character patterns when characters larger than the reference size are to be printed. It may be a device which generates a third order spline curve to output characters. Numeral 8 denotes a data converter which generates character data to be used by the pattern generator 7, numeral 9 denotes an output interface which sends the print data generated by the controller 4 to a printer, and numeral 10 denotes the printer which prints out the print data sent from the output interface 9.

Figure 2:
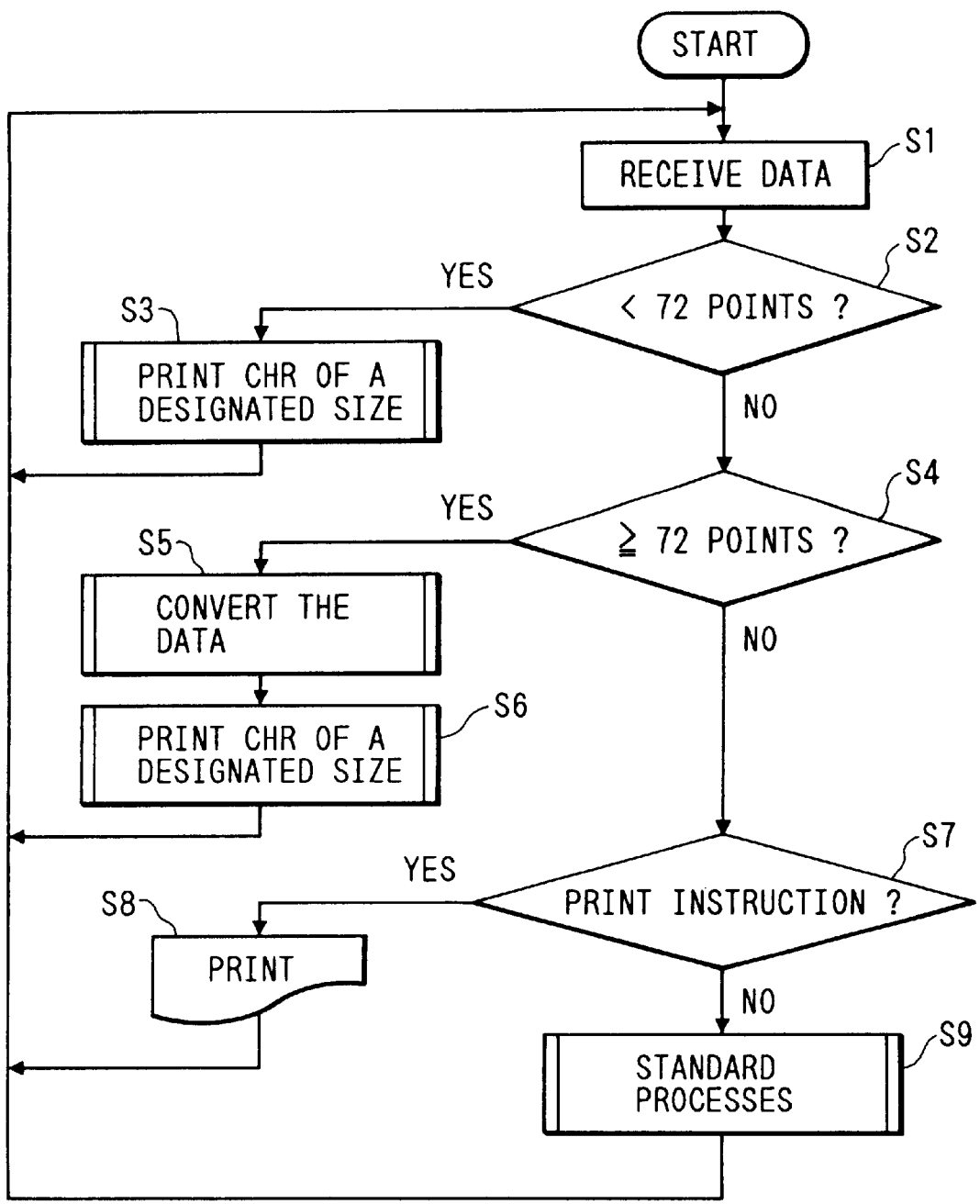
FIG. 2 is a flow chart illustrating control of the printer of FIG. 1 in accordance with the present invention, FIG. 3 diagrammatically shows a character pattern.

Referring to a control flow chart of FIG. 2, the control of the present embodiment is explained. The data sent from the host computer 1, which may be edit information such as character code, size or rotation is received in a step S1. In a step S2, it is determined whether it is printing of characters smaller than a reference size that is to be done, or not. If it is the printing of the characters smaller than the reference size (here, 72 points, by way of example), the process proceeds to a step S3; otherwise the process proceeds to a step S4. In the step S3, character patterns of a designated size are generated by the small size character pattern generator by using the run length character data stored in the data storage 6. In the step S4, whether it is the printing of characters larger than the reference size that is to be done, or not, is determined. If it is the printing of the characters larger than the reference size, the process proceeds to a step S5, and otherwise the process proceeds to a step S7. In the step S5, the character data stored in the small size character data storage 6 is converted to a format for use in the large size character pattern generator 7, by the data converter 8. Details thereof will be explained below with reference to FIG. 6. In the step S6, character patterns of the designated size are generated by the large size character pattern generator 7 by using the third order spline curve based on the data converted in the step S5. In the step S7, whether it is a print command or not is determined. If it is a print command, the process proceeds to a step S8, and otherwise the process proceeds to a step S9. In the step S8, the command executed by the controller 4 is sent to the printer 10 through the output interface 9. In the step S9, a normal processing (i.e., whatever else should be going on at the time) is carried out.

Figure 3:
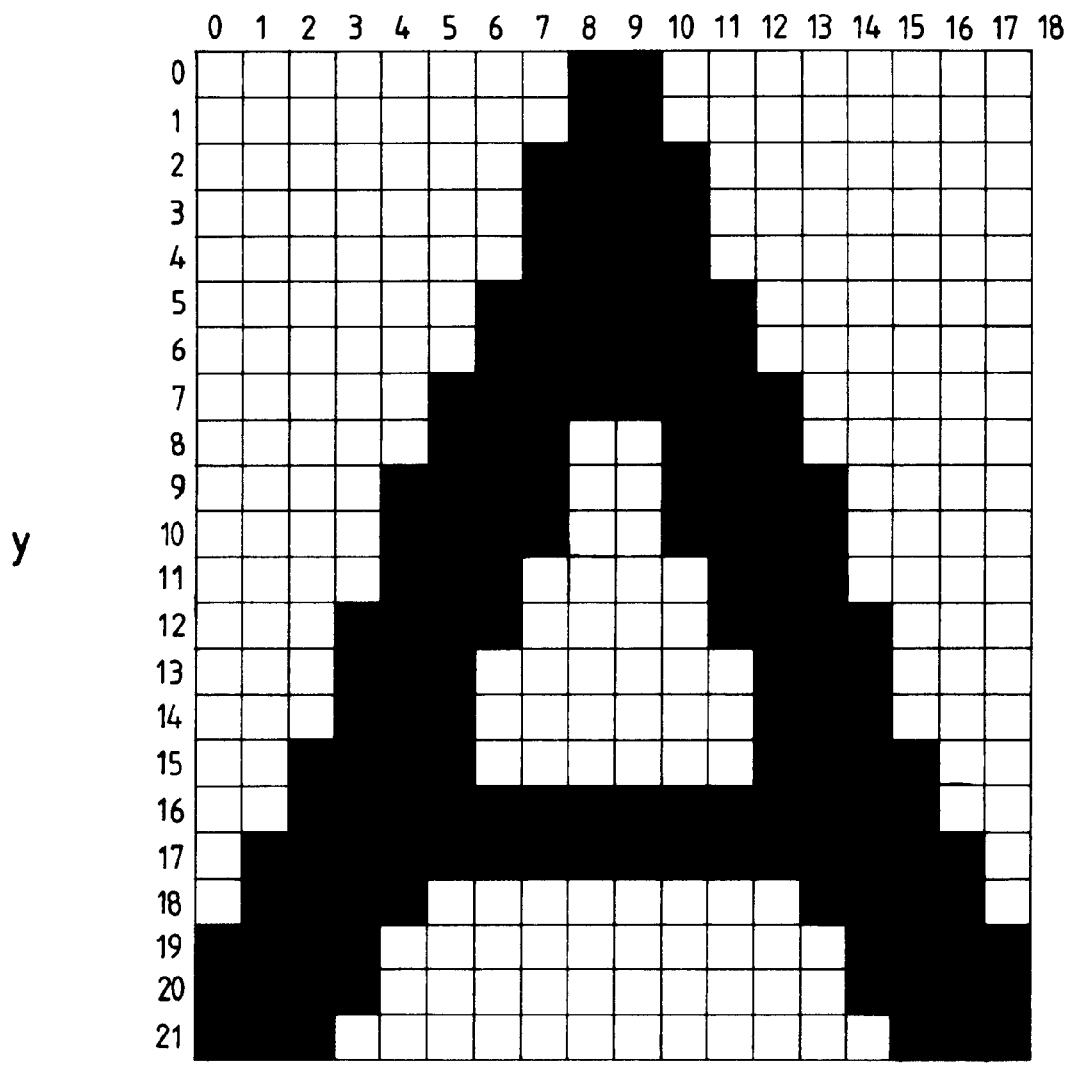

The small size character data storage 6 stores therein the pattern information in run length form. The term run length is frequently used in a facsimile machine and it may be an MR (modified READ) code. The run length data of the pattern shown in FIG. 3 is shown in FIG. 4. In FIG. 4, coordinates of points at which white dots change to black dots along the x-coordinates, for each y-coordinate, are shown. Normally, when a character is to be generated, all points between the point where the data changes to black to a point before that point where the data changes to white, are painted black.

Figure 5:
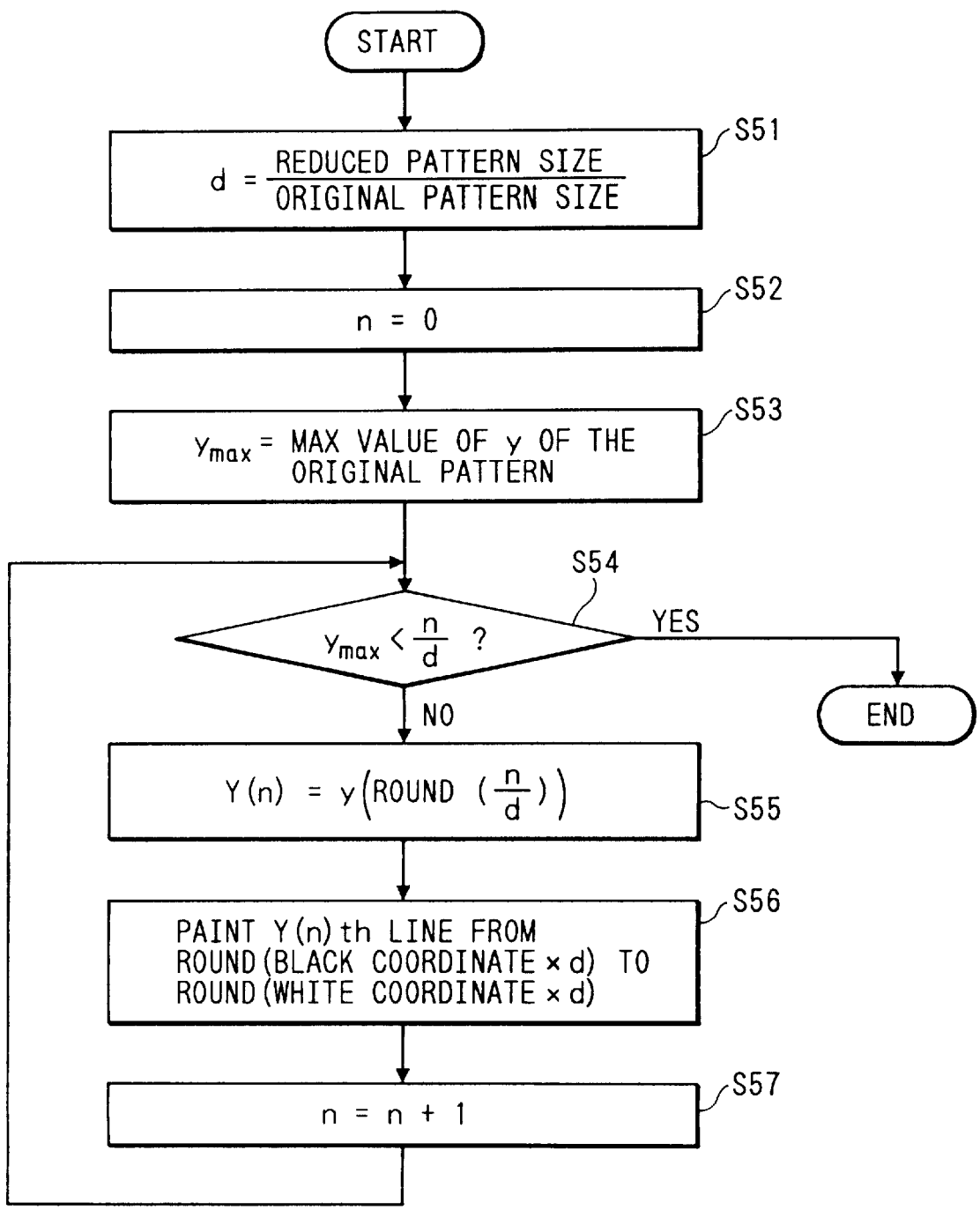
FIG. 5 is a flow chart illustrating a method for reducing run length data.

FIG. 5 shows a method to reduce the run length data. The original pattern for the run length data is of 72-point pattern size. When character of smaller than 72-point size is to be printed, a pattern is generated in accordance with this flow chart. In a step S51, a reduction factor d is calculated. In a step S52, a counter n is cleared. In a step S53, Ymax is set to a maximum y of the original pattern. In a step S54, end of pattern generation is checked. If Ymax<n/d, it is the end of pattern generation. In a step S55, the y-coordinate of the original pattern to be used in generating the reduced pattern is calculated and is substituted for Y(n). In a step S56, the points from a black point to a point before a white point in the data in the line Y(n) are painted in accordance with the reduction factor.

The x-coordinate is represented by rounding off the value (x-coordinate/reduction factor). Thus, round (black coordinate/reduction factor) to a point before the value rounded off from (white coordinate/reduction factor) are painted. In a step S57, the y-coordinate counter is incremented by one and the process returns to the step S54. In this manner, the small size character patterns are generated in the step S3.

Figure 6:
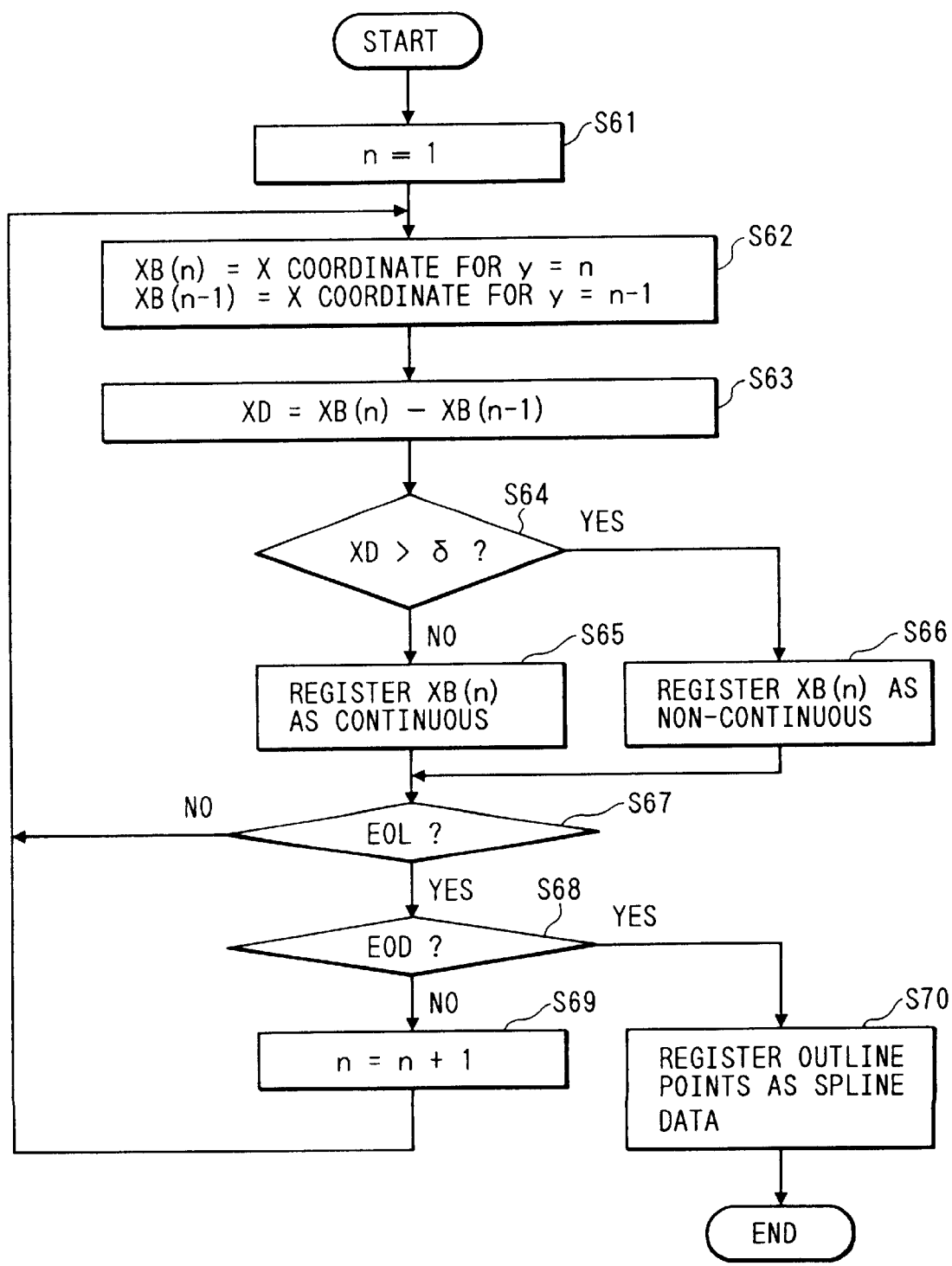
FIG. 6 is a flow chart for converting the run length data to spline type data.

The step S5 of FIG. 2 is now explained with reference to a detailed flow chart of FIG. 6. In FIG. 6, the data in the form of FIG. 4 is converted to data in a third order spline form. Namely, it is interpolated by a third order spline curve based on outline information of the pattern. In a step S61, the counter n is set to "1". In a step S62, x contents of y-coordinate designated by the counter n are fetched. The x contents are fetched in the order of black, white, black, white coordinates. In a step S63, a difference between the x-coordinate and an x-coordinate at the y-coordinate which is one smaller than the current y-coordinate is calculated and is substituted for XD. In a step S64, XD is compared with a threshold $\delta$ which is a constant determined by a resolution power of the original data. If XD>$\delta$, (for example, (x,y)= (12,7) and (7,8)), the process proceeds to a step S66 where the discontinuity of the points is registered. Otherwise, the process proceeds to a step S65 where the continuity is registered. In a step S67, whether all x contents of the line have been processed or not is checked, and if they have been processed, the process proceeds to a step S68, otherwise the process proceeds to the step S62. In the step S68, whether all data have been processed or not is determined by the EOD code included in the x-coordinate data. If they have not been processed, the process proceeds to a step S69, otherwise the process proceeds to a step S70. In this manner, closed loop data representing an outline of the character is produced. In the step S69, the counter is incremented by one and the process returns to the step S62. In the step S70, the outline points are registered as three-order spline data based on the information registered in the steps S65 and S66. The continuous data is registered as continuous data, and discontinuous data is registered to be continuous with closest other discontinuous data or discontinuous data having the same y-coordinate. Since the third-order spline development method and data format are well known, detailed explanation thereof is omitted. The steps S61–S70 are processed in the step S5 of FIG. 2 by the data converter 8 of FIG. 1.

The data registered in the step S70 is developed in the step S6 by the third order spline method. Needless to say, the expansion of data of the third order spline method is superior in quality to the expansion by the run length method.

Figure 7:
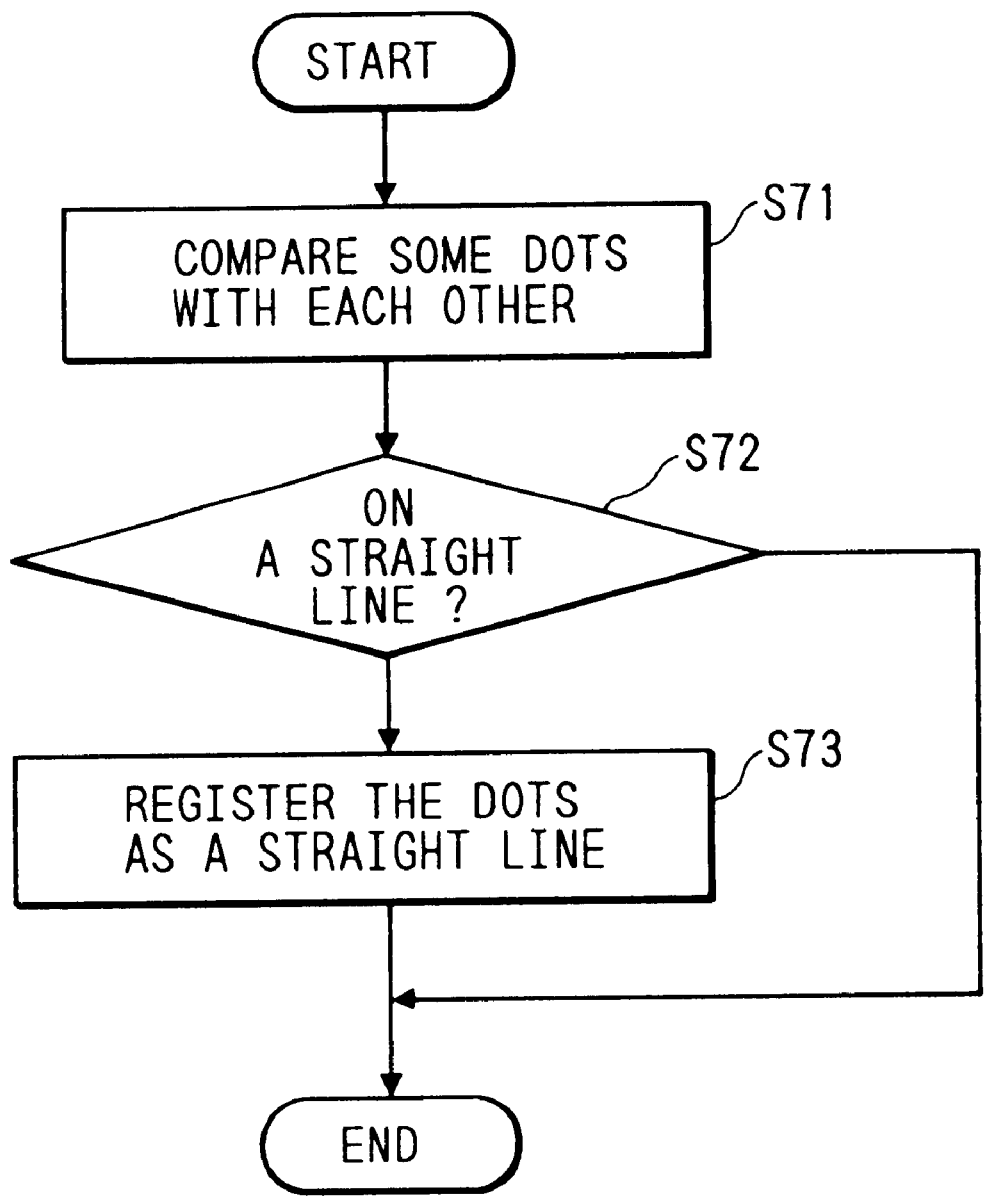
FIG. 7 is a flow chart for recognizing linear data.

In the step S70, the discontinuous data is rendered continuous and linear data is detected. The detailed flow thereof is shown in FIG. 7. Whether it is linear or not is determined by checking whether successive dots are on a straight line or not. In FIG. 7, in a step S71, whether successive dots are on a straight line or not is checked. In a step S72, whether it is determined as a straight line or not based on the result of the step S71 is checked, and if it is determined as a straight line, the process proceeds to a step S73.

In the step S73, successive dots on the outline are registered as a straight line having a start point and an end point. In this manner, points between the start point and the end point on the same line may be omitted. Data which identifies that this portion is a straight line may additionally be registered. Data necessary for various units described above or to be described later are stored in a work memory in the controller 4 shown in FIG. 1.

Figure 8:
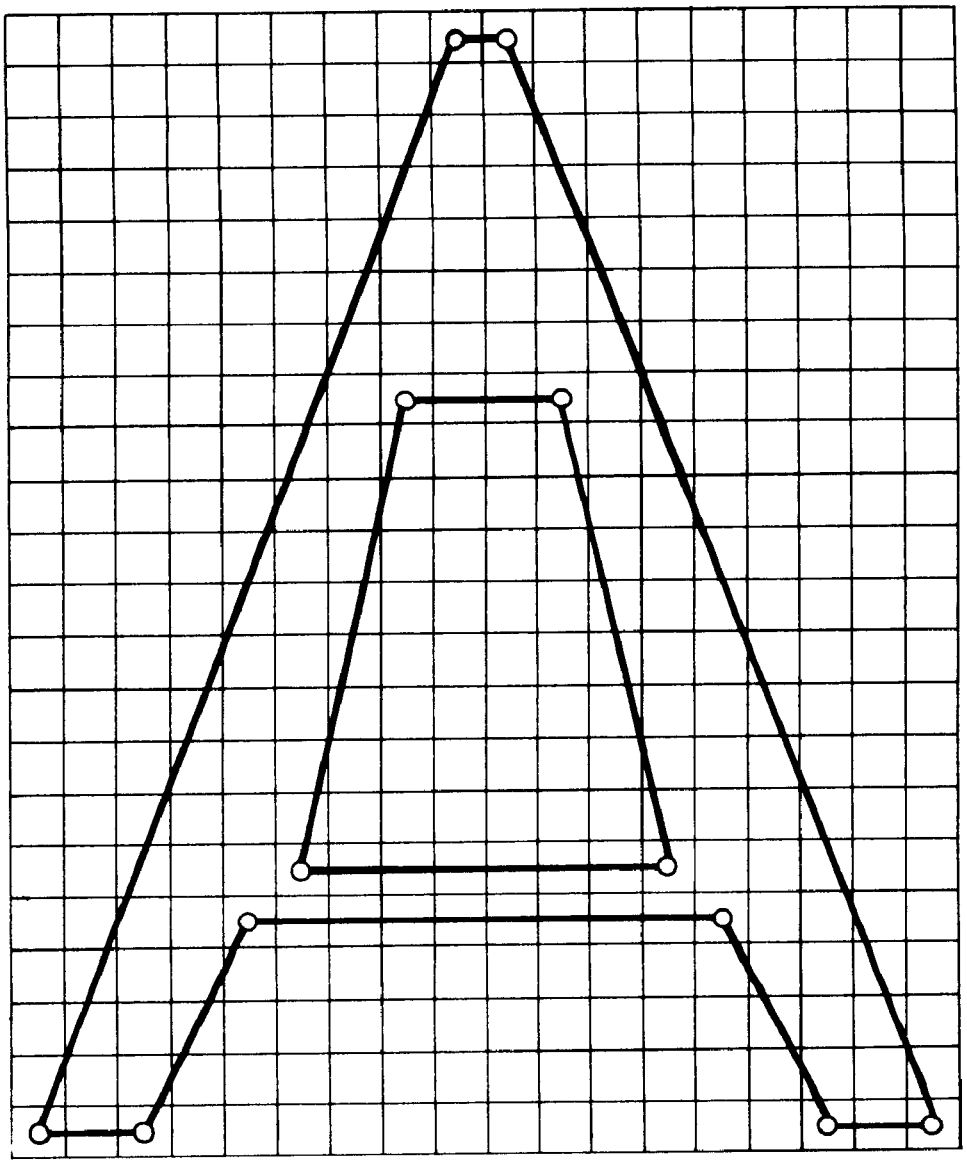
FIG. 8 shows a character pattern represented using a third order spline.

FIG. 8 shows a third order spline representation of the pattern shown in FIG. 3. This pattern comprises an aggregation of only straight lines.

Figure 9:
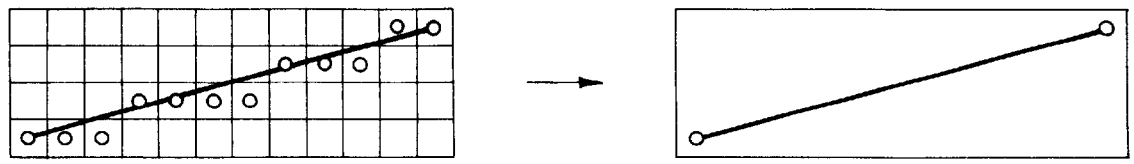
FIG. 9 illustrates how to convert successive points to a straight line.
Figure 10:
FIG. 10 shows curves represented by a third order spline.
Figure 11:
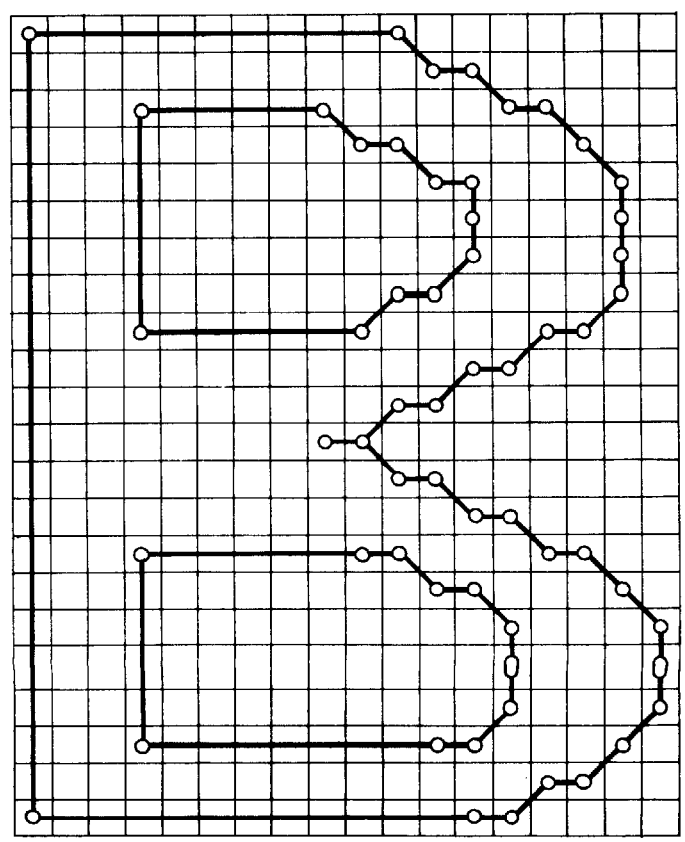
FIG. 11 shows third order spline data including a curve.

FIG. 9 illustrates linearization of successive points by the algorithm shown in FIG. 7. FIG. 10 shows how non-linearized successive points are developed. In the third order spline, they are represented as a smooth curve. FIG. 11 shows an example of data in the third order spline system which includes curved portions. In FIGS. 8 to 11, circles O indicate control points of the third order spline.

In accordance with the present embodiment, the following advantages are offered.

(1) Degradation of print quality due to the character size is prevented.

(2) A device to store special information for improving the print quality is not necessary and the increase of cost is suppressed.

(3) Appropriate development method (appropriate in factors such as speed, etc.) may be used depending on the size.

(4) Data compression is attained.

Another Embodiment

Figure 14:
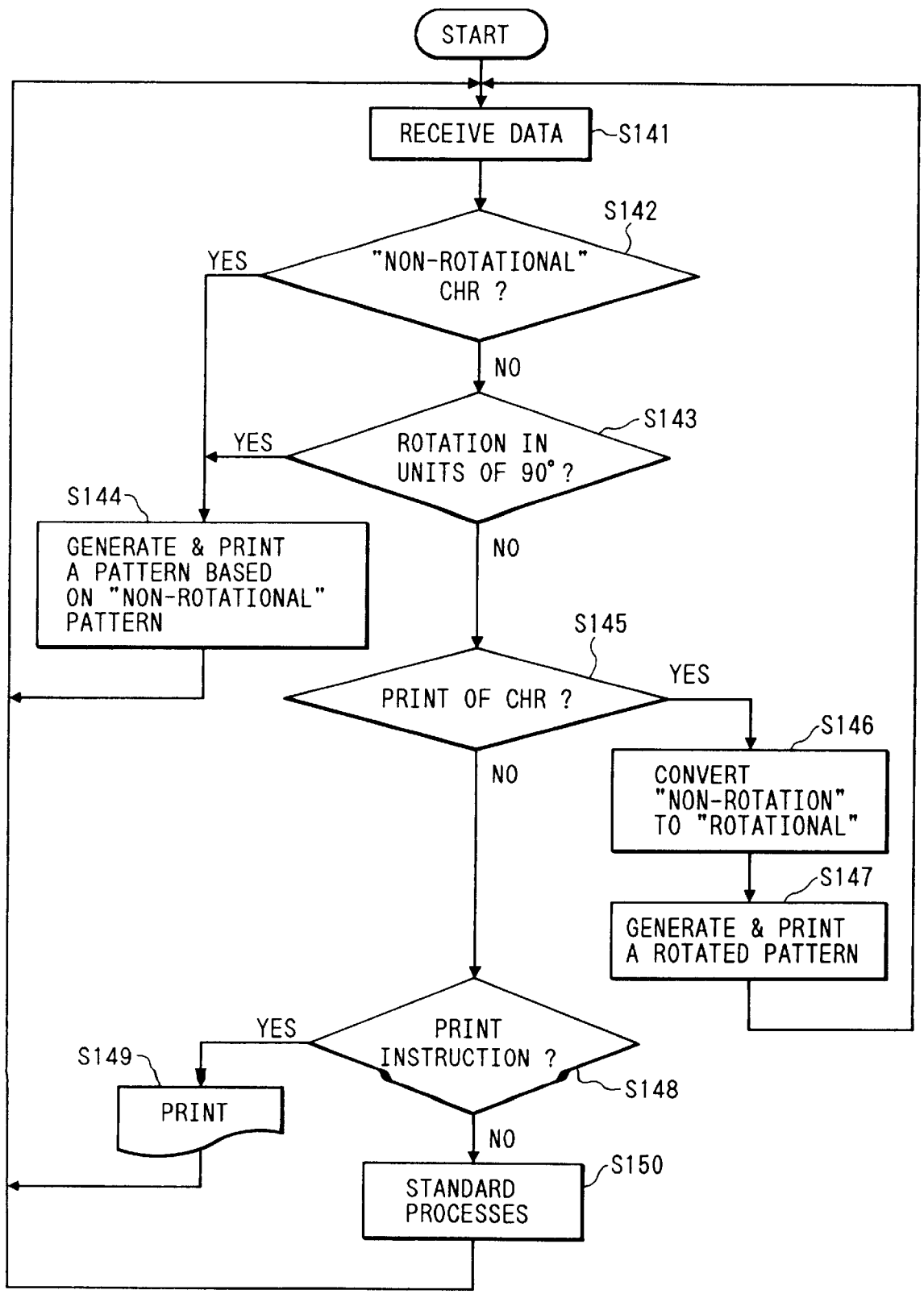
FIG. 14 shows a control flow chart for the second embodiment.

Another embodiment which uses one of the generation methods explained in FIGS. 1–11 depending the type of editing (for example, rotation) is explained with reference to FIG. 14. Run length font data (which is called non-rotation data in that arbitrary rotation is not permitted) instead of the small size character data is stored into the small size character data storage 6 shown in FIG. 1. Numeral 5 denotes a non-rotation character pattern generator (which converts the run length font to a dot pattern), and numeral 7 denotes a rotation character pattern generator. Steps S141, S148, S149 and S150 in FIG. 14 are similar to the steps S1, S7, S8 and S9 in FIG. 2 and the explanation thereof is omitted. In a step S142, whether it is the printing of the non-rotation character that is to be done, or not, is determined. If it is the printing of the non-rotation character, the process proceeds to a step S144, and otherwise the process proceeds to a step S143. In the step S143, a check is made to determine if it is the printing of the character of rotation at 90 degrees pitch, that is, 90 degrees, 180 degrees or 270 degrees, that is to be done. If it is the rotation at 90 degrees pitch, the process proceeds to a step S144, and otherwise the process proceeds to a step S145. In the step S144, the pattern is developed in a similar manner to that shown in FIG. 5. The generation of the rotation pattern at 90 degrees pitch from the run length data can be readily done by reversing the direction of coordinates (i.e., x-y axis conversion). In a step S145, whether it is the printing of a character or not is checked. If it is the printing of a character, the process proceeds to a step S146, while otherwise the process proceeds to a step S148. In the step S146, the pattern is converted to third order spline data in the manner shown in FIG. 6. The third order spline data can easily be rotated to any angle. In a step S147, the pattern rotated to the designated and the data converted in the step S146 are generated and printed.

Figure 15:
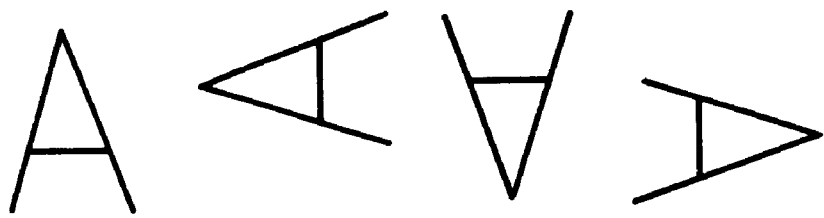
FIG. 15 shows rotated patterns at every 90 degrees.
Figure 16:
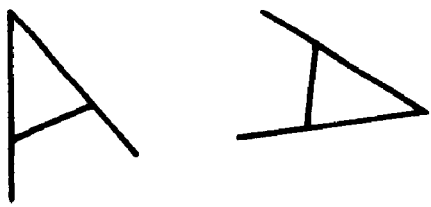
FIG. 16 shows rotated patterns at arbitrary angles.

FIG. 15 shows an example of pattern developed in the step S144. FIG. 16 shows an example of pattern developed in the step S147.

In accordance with the present embodiment, the following advantages are offered.

(1) Rotation of pattern to any angle.

(2) High speed development of frequently used characters at 90 degrees pitch.

A configuration of a second embodiment of the present invention is now explained.

Figure 12:
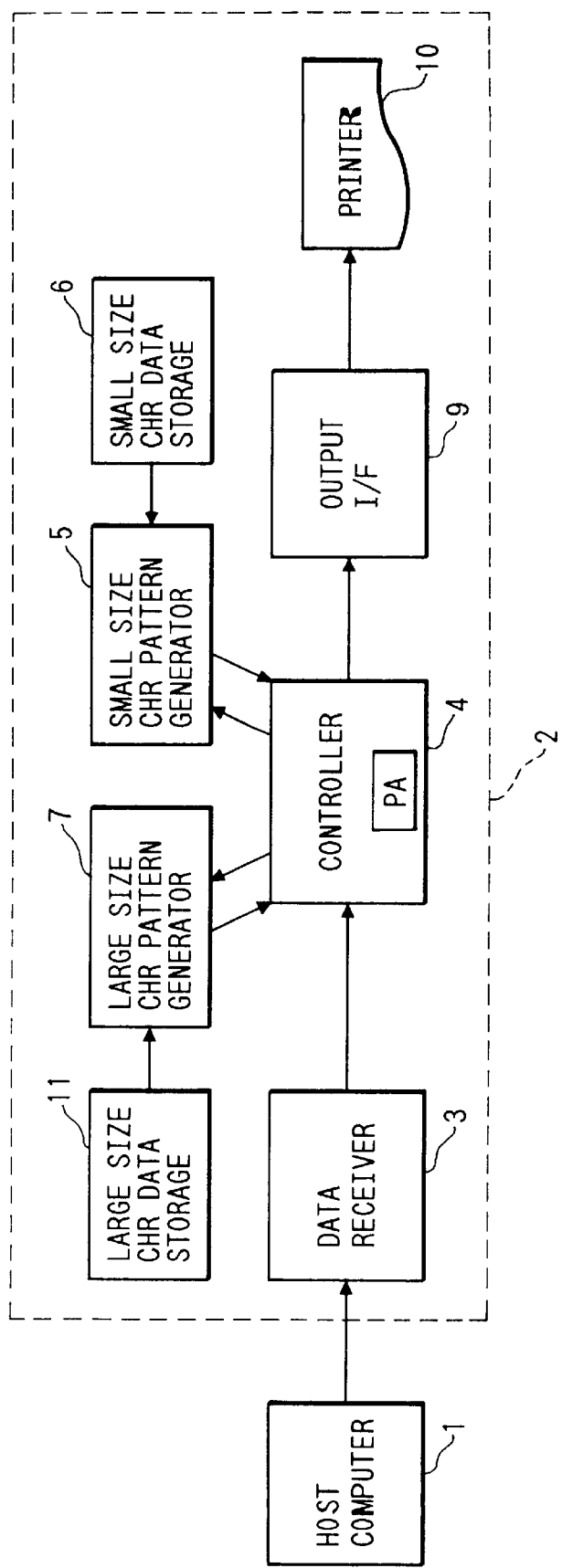
FIG. 12 is a block diagram of another embodiment of the invention.

FIG. 12 best shows a feature of the present embodiment. Numeral 1 denotes a host computer which sends data, numeral 2 denotes a printer applicable to the present invention, and numeral 3 denotes a data receiver for receiving the data sent from the host computer 1. It has a program area PA for storing a control program shown in a flow-chart of FIG. 13. Numeral 75 denotes a large size character pattern generator which generates character patterns when data decoded by the controller 4 is a print command to print characters larger than a reference size, numeral 11 denotes a large size character data storage which stores data used to generate the pattern by the pattern generator 7, numeral 5 denotes a small size character pattern generator which generates character patterns when data decoded by the controller 4 is a print command to print characters no larger than the reference size, numeral 6 denotes a small size character data storage which stores data used to generate the pattern by the pattern generator 5, numeral 9 denotes an output interface which sends the print data generated by the controller 4 to a printer, and numeral 10 denotes the printer which prints out the print data send from the output interface 9.

Figure 13:
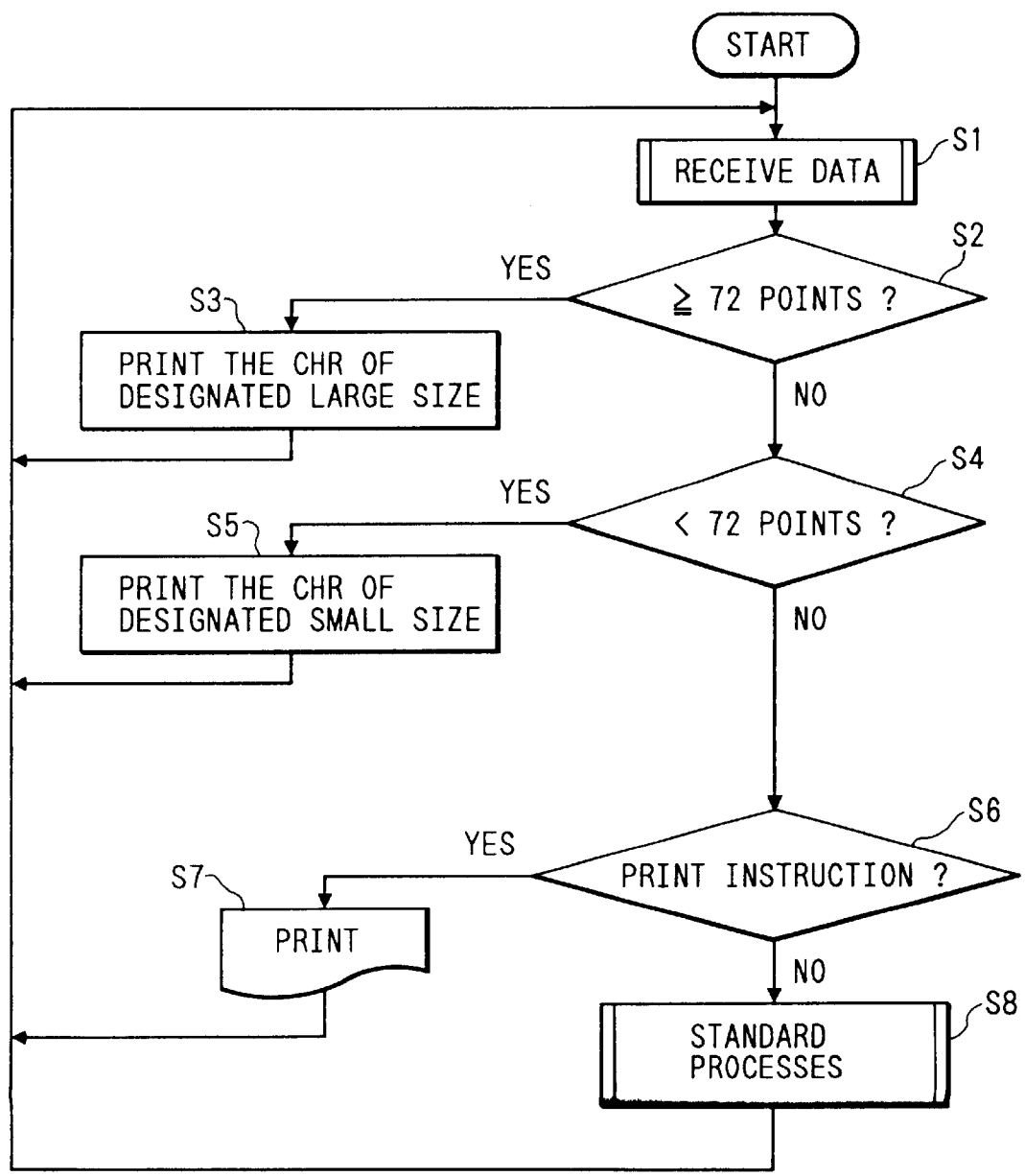
FIG. 13 is a control flow chart for the embodiment of FIG. 12.

Referring to the control flow chart of FIG. 13, the control of the present embodiment is explained. The data sent from the host computer 1 is received in a step S1. In a step S2, whether it is the printing of characters of larger than the reference size or not is checked. If it is the printing of characters of larger than the reference size, the process proceeds to a step S3, and otherwise the process proceeds to step S4. In the step S3, characters of a designated size are generated by the large size character pattern generator 7 by using the character data to be printed, which is stored in the large size character data storage 11. In the step S4, whether it is the printing of characters of no larger than the reference size or not is checked, and if it is the printing of characters of no larger than the reference size, the process proceeds to a step S5, while otherwise the process proceeds to a step S6. In the step S5, characters of a designated size are generated by the small size character pattern generator 5 by using character data to be printed, which is stored in the small size character data storage 6. In the steps S2 and S4, the reference size is 72 points although it is not restrictive. In a step S6, whether it is a print command or not is determined. If it is the print command, the process proceeds to a step S7, and otherwise the process proceeds to a step S8. In the step S7, the command executed by the controller 4 is sent to the printer 10 through the output interface. In the step S8, a normal process is carried out.

The data stored in the large size character data storage 11 and the small size character data storage 6 may be character data represented by a B spline and a short vector, respectively. The B spline data permits high speed generation of high quality expanded pattern. On the other hand, the short vector data (which represents characters by straight lines) is faster than the B spline data but the quality in expansion is lower. Accordingly, it is not suitable for the expansion of larger than a predetermined size, but it is sufficient to generate a small size pattern.

In accordance with the present embodiment, the following advantages are offered.

(1) The most appropriate pattern generation method relative to such as print quality or speed may be selected depending on the character size.

The above embodiment has two character generators for the large size characters and the small size characters. More than two character generators may be provided so that a character generator having a most appropriate generation method to the particular character size may be selected.

In accordance with the present invention, the run length font is stored, and the dot pattern is generated from the run length font or the character outline information is derived from the run length font and then the dot pattern is generated, in accordance with the output condition such as the output size.

What is claimed is:

1. A character processing apparatus comprising:

memory means for storing font data;

discrimination means for discriminating a size of a character to be output; and control means for controlling outputting a character according to the character size discriminated by said discrimination means such that outline data representing a character outline is generated based on the font data stored in said memory means in correspondence to the character to be output and a character is outputted using the generated outline data, or a character is outputted using the font data stored in said memory means in correspondence to the character to be output without generating the outline data.

2. An apparatus according to claim 1, wherein said generation means generates the outline data in a third order spline form.

3. An apparatus according to claim 1, wherein the font data stored in said memory means comprises run-length compressed font data.

4. An apparatus according to claim 1, further comprising output means for outputting the character in accordance with a control by said control means.

5. An apparatus according to claim 4, wherein said output means comprises a printer.

6. A character processing apparatus comprising:

memory means for storing compressed font data;

discrimination means for discriminating an output condition for a character to be output; and generation means, responsive to the output condition discriminated by said discrimination means, for generating a character pattern either (1) by using the compressed font data stored in said memory means in correspondence to the character to be output, or (2) by generating outline data representing a character outline using the compressed font data stored in said memory means in correspondence to the character to be output and by using the generated outline data, wherein said generation means generates the character pattern either (1) by using the compressed font data stored in said memory means in correspondence to the character to be output when that character has a size smaller than a predetermined size, or (2) by generating the outline data using the compressed font data stored in said memory means in correspondence to the character to be output and by using the generated outline data when that character has a size not smaller than the predetermined size.

7. A character processing apparatus comprising:

memory means for storing compressed font data;

discrimination means for discriminating an output condition for a character to be output; and generation means, responsive to the output condition discriminated by said discrimination means, for generating a character pattern either (1) by using the compressed font data stored in said memory means in correspondence to the character to be output, or (2) by generating outline data representing a character outline using the compressed font data stored in said memory means in correspondence to the character to be output and by using the generated outline data, wherein said generation means generates the character pattern either (1) by using the compressed font data stored in said memory means in correspondence to the character to be output when that character is to be output with a rotation of 90°, 180° or 270°, or (2) by generating the outline data using the compressed font data stored in said memory means in correspondence to the character to be output and by using the generated outline data when that character is to be output with a rotation other than 90°, 180° and 270°.

8. A character processing method using a memory for storing font data, comprising the steps of:

discriminating a size of a character to be output; and controlling outputting a character according to the character size discriminated by said discriminating step such that outline data representing a character outline is generated based on the font data stored in the memory in correspondence to the character to be output and a character is outputted using the generated outline data, or a character is outputted using the font data stored in said memory in correspondence to the character to be output without generating the outline data.

9. A method according to claim 8, wherein said generating step generates the outline data in a third order spline form.

10. A method according to claim 8, wherein the font data stored in the memory comprises run-length compressed font data.

11. A method according to claim 8, further comprising a step of outputting the character in accordance with a control by said controlling step.

12. A method according to claim 11, wherein said outputting step outputs the character using a printer.

13. A character processing method using a memory for storing compressed font data, comprising the steps of:

discriminating an output condition for a character to be output; and responsive to the discriminated output condition, generating a character pattern either (1) by using the compressed font data stored in the memory in correspondence to the character to be output, or (2) by generating outline data representing a character outline using the compressed font data stored in the memory in correspondence to the character to be output and by using the generated outline data, wherein said generating step generates the character pattern either (1) by using the compressed font data stored in the memory in correspondence of the character to be output when that character has a size smaller than a predetermined size, or (2) by generating the outline data using the compressed font data stored in the memory in correspondence to the character to be output and by using the generated outline data when that character has a size not smaller than the predetermined size.

14. A character processing method using a memory for storing compressed font data, comprising the steps of:

discriminating an output condition for a character to be output; and responsive to the discriminated output condition, generating a character pattern either (1) by using the compressed font data stored in the memory in correspondence to the character to be output, or (2) by generating outline data representing a character outline using the compressed font data stored in the memory in correspondence to the character to be output and by using the generated outline data, wherein said generating step generates the character pattern either (1) by using the compressed font data stored in the memory in correspondence to the character to be output when that character is to be output with a rotation of 90°, 180° or 270°, or (2) by generating the outline data using the compressed font data stored in the memory in correspondence to the character to be output and by using the generated outline data when that character is to be output with a rotation other than 90°, 180° and 270°.

15. A computer readable medium having recorded thereupon codes for implementing a computer implementable method of character processing using a memory for storing font data, comprising the steps of:

discriminating a size of a character to be output; and controlling outputting a character according to the character size discriminated by said discriminating step such that outline data representing a character outline is generated based on the font data stored in the memory in correspondence to the character to be output and a character is outputted using the generated outline data, or a character is outputted using the font data stored in said memory in correspondence to the character to be output without generating the outline data.

16. A medium according to claims 15, wherein said generating step generates the outline data in a third order spline form.

17. A medium according to claim 15, wherein the font data stored in the memory comprises run-length compressed font data.

18. A medium according to claim 15, further comprising a step of outputting the character pattern in accordance with a control by said controlling step.

19. A medium according to claim 18, wherein said outputting step outputs the generated character pattern using a printer.

20. A computer readable medium having recorded thereupon codes for implementing a computer implementable method of character processing using a memory for storing compressed font data, comprising the steps of:

discriminating an output condition for a character to be output; and responsive to the discriminated output condition, generating a character pattern either (1) by using the compressed font data stored in the memory in correspondence to the character to be output, or (2) by generating outline data representing a character outline using the compressed font data stored in the memory in correspondence to the character to be output and by using the generated outline data, wherein said generating step generates the character pattern either (1) by using the compressed font data stored in the memory in correspondence to the character to be output when that character has a size smaller than a predetermined size, or (2) by generating the outline data using the compressed font data stored in the memory in correspondence to the character to be output and by using the generated outline data when that character has a size not smaller than the predetermined size.

21. A computer readable medium having recorded thereupon codes for implementing a computer implementable method of character processing using a memory for storing compressed font data, comprising the steps of:

discriminating an output condition for a character to be output; and responsive to the discriminated output condition, generating a character pattern either (1) by using the compressed font data stored in the memory in correspondence to the character to be output, or (2) by generating outline data representing character outline using the compressed font data stored in the memory in correspondence to the character to be output and by using the generated outline data, wherein said generating step generates the character pattern either (1) by using the compressed font data stored in the memory in correspondence to the character to be output when that character is to be output with a rotation of 90°, 180° or 270°, or (2) by generating the outline data using the compressed font data stored in the memory in correspondence to the character to be output and by using the generated outline data when that character is to be output with a rotation other than 90°, 180° and 270°.

* * * * *

UNITED STATES PATENT AND TRADEMARK OFFICE
CERTIFICATE OF CORRECTION

PATENT NO. : 6,126,342
DATED : October 3, 2000
INVENTOR(S) : Tsuneaki Kurumida

It is certified that error appears in the above-identified patent and that said Letters Patent is hereby corrected as shown below:

Column 1,
Line 28, "size" should read -- size are --;
Line 32, "is" should read -- are --.

Column 3,
Line 38, "a" should be deleted;
Line 66, "round" should read -- from the rounding of --.

Column 4,
Line 3, "arid" should read -- and --.

Column 5,
Line 21, "depending" should read -- depending on --;
Line 52, "designated" should read -- designated angle --.

Column 6,
Line 17, "send" should read -- sent --;
Line 57, "(1)" should be deleted. --.

Column 9,
Line 23, "claims" should read -- claim --.

Signed and Sealed this

Eighteenth Day of December, 2001

Attest:

*Attesting Officer*

JAMES E. ROGAN
*Director of the United States Patent and Trademark Office*